March 31, 1959          G. C. IRWIN          2,879,847
PROCESS FOR INCREASING THE FLOW IN OIL WELLS
Filed Nov. 29, 1954
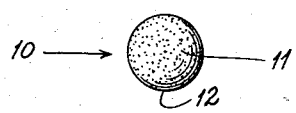
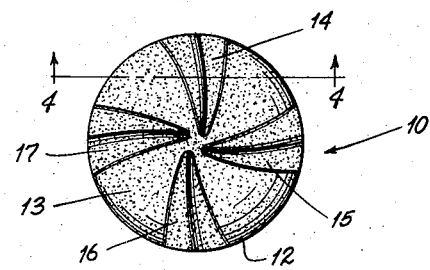
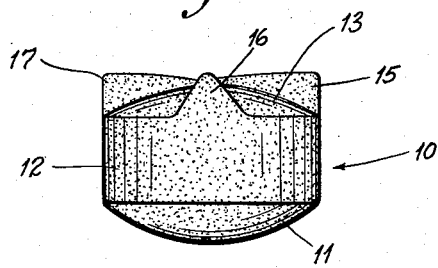
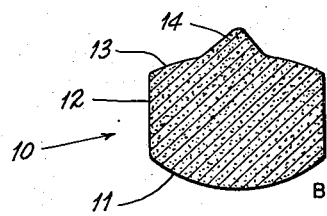
INVENTER,
GEORGE C. IRWIN, DECEASED,
BY ELISE V. IRWIN, ADMINISTRATRIX
By Kingsland, Rogers & Ezell
ATTORNEYS United States Patent Office 2,879,847
Patented Mar. 31, 1959

2,879,847

PROCESS FOR INCREASING THE FLOW IN OIL WELLS

George C. Irwin, deceased, late of University City, Mo., by Elise V. Irwin, administratrix, University City, Mo., assignor of one-half to August W. Willert, Jr., Webster Groves, Mo., one-sixth to Elise V. Irwin, one-sixth to said Elise V. Irwin, as guardian of Dale Judson Irwin, a minor, and one-sixth to said Elise V. Irwin, as guardian of Ann Elise Irwin, a minor Application November 29, 1954, Serial No. 471,674

4 Claims. (Cl. 166—42)

This invention relates to improvements in oil well producing methods, and in particular is concerned with the use of a composition which has a variable melting point and a solvent affinity for paraffin, asphalt and other petroleum residues.

This invention is a continuation-in-part of the application of George C. Irwin for Method for Recovering Oil from Oil Wells, Serial No. 270,143, filed February 6, 1952, now Patent No. 2,711,392. In that application, there was disclosed an invention for producing a solvent which would have a melting point at the top of the bore hole above the temperature of the ambient conditions on the surface, but which when inserted in the well in the oil producing region would have a melting point below the temperature in the lower regions of the well to dissolve solid accumulations such as paraffin, asphalt and the like.

By means of the present invention, it has been made possible to use a composiiton similar to that disclosed in said Patent No. 2,711,392, which may be modified by the addition of another component to effect fracturing, bridging and propping of the oil bearing strata. In the present invention, a porous discrete material may also be utilized to enhance the results in the bridging and propping operations.

Further, it is contemplated by the present invention that there can be introduced into the bottom of the bore hole a solvent, in either slurry or solid form, which can dissolve solid accumulations of paraffin, asphalt and other petroleum residues in the formation, casing or other portions of the oil well string, in combination with an elevated temperature producing agent, such as caustic soda which raises the temperature of this region when contacted with water to enhance and increase the solvency action.

It is further contemplated in this invention to provide a combination solvent and attrition product which can be incorporated into oil lines which are subject to accumulation of paraffin and asphalt and other petroleum residues which would tend to block the flow in the lines. This product is formed in such a manner that it would have very sharp edges, such as in the form of burrs, to wear down the solid accretions by attrition, and also to effectuate the removal of the accretions by a solvent action, since the solid product has solvent characteristics.

Accordingly, it is a primary object of this invention to provide a composition and process for fracturing or bridging the oil producing strata surrounding a bore hole by the employment of a composition which has a variable melting point, depending upon the components of the composition.

It is a further object of this invention to provide a composition and process for fracturing and bridging the strata surrounding the bore hole by the employment of a composition which has a variable melting point and which has a solvent capacity for paraffin, asphalt and oil, and the melting point of which increases with the increase in pressure to which it is subjected.

Still a further object of this invention is to provide a composition and process for fracturing and bridging the strata surrounding the desired portion of a bore hole by the employment of a composition which has a variable melting point and includes naphthalene, and at least one of orthodichlorobenzene and paradichlorobenzene.

Yet another object of this invention is to provide a composition and process for fracturing, bridging and propping the strata surrounding a desired portion of a bore hole by the use of an organic composition in slurry or solid form incorporated with a relatively porous discrete material of inorganic composition.

Still a further object of this invention is to provide a composition and process for fracturing, bridging and propping the strata surrounding a desired area in a bore hole by means of an organic composition with an inorganic, relatively porous material which is chemically inert and resistant to solvent action, and wherein the organic composition will ultimately dissolve, leaving the inorganic discrete material as a propping material.

Still another object of the invention is to provide a composition and process for fracturing, bridging and propping an area surrounding a bore hole by the use of an organic composition in slurry or solid form comprising naphthalene and at least one of orthodichlorobenzene and paradichlorobenzene with a discrete, relatively porous aluminum silicate material, and wherein the organic material, after the fracturing and bridging action has been accomplished, will dissolve leaving the discrete material as a solid propping agent, which permits the seepage of oil therethrough.

Yet another object of this invention is to provide a composition and process for cleaning out solid petroleum residues within a formation, bore hole or oil well string by the use of an organic composition which has a solvent action therefor, in combination with an agent which, when introduced into water in the area desired to be cleaned, elevates the temperature.

Still a further object of this invention is to provide a composition and process for cleaning out solid petroleum residues by means of an organic composition in either slurry or solid form having a variable melting point and comprising naphthalene and at least one of orthodichlorobenzene and paradichlorobenzene, together with a caustic agent which will react with water in the desired region to elevate the temperature and enhance the solvent action to clean out said residues and dissolve the same.

Still another object of this invention is to provide a composition and process and article for cleaning out oil lines and the like which are subject to accretion and deposition of petroleum residues by the use of a solid organic composition having sharp surface contours, and which is in the form of a solid configuration adapted to pass through the line without clogging to clean out said residues by attrition and by solvent action of said composition.

Yet a further object of this invention is to provide a process and article for cleaning out solid accretions of paraffin and asphalt and other petroleum residues in oil lines by the use of an organic composition which is solid and has a sharp-edged configuration permitting its passage through the line to wear down said accretions by attrition and by solvent action, and wherein the organic composition comprises naphthalene and paradichlorobenzene.

Further objects of this invention will appear in the detailed description which follows and will be further apparent to those skilled in the art.

For the purpose of illustration, there is shown in the accompanying drawings a preferred form of the sharp-edged organic cleaning article. However, it is to be understood that the invention is not limited thereto.

In the drawings:

Figure 1 is a bottom plan view of the article;
Figure 2 is an enlarged top plan view;
Figure 3 is an enlarged view in side elevation; and
Figure 4 is a cross-sectional view taken on the line 4—4 of Figure 2.

The process and composition of this invention are particularly well adapted to be utilized in fracturing operations in the area surrounding the bore hole. In such fracturing operations, the surrounding strata at a preselected depth is desired to be fractured or the trata is desired to be broken up in such a manner that fissures are enlarged to permit the ultimate flow of oil therethrough in a more speedy and advantageous manner. In this process, the composition of this invention can be used in either slurry form comprising naphthalene, orthodichlorobenzene and paradichlorobenzene, or in solid form with just napthalene and paradichlorobenzene. In general, it can be said that, when orthodichlorobenzene is used, the composition will be in slurry form since its M.P. is —17.5° C. In either case of solid or slurry form, the composition may be conveniently introduced to the selected depth in the bore hole, since the specific gravity is between about 1.2 to 1.3. When the slurry form with orthodichlorobenzene is used, there are some crystals present which are very desirable as they are of fairly large particle size and of more bulk than the straight crystals of the naphthalene dichlorobenzene mixture which are of needle-like form. This former type of crystal gives a better blocking action than the latter in the practice of this invention.

In solid physical form and from the top of the bore hole, the composition can be introduced to the selected depth within the bore hole at which the higher temperature prevailing at this depth can effect the melting of the composition. Also, if desired, the tubing of the bore hole can be supplied with circulating hot oil in order that it may be heated to a point above the melting point of the solid material.

The composition and material have excellent penetrating qualities as well as excellent solvent properties, and can be pumped under pressure through the tubing and directly into the formation. After entering the formation, the length of time or distance of travel into the formation may be controlled by the melting point of the material, which depends upon the composition and the relative percentage of its components. Under increased pressure, such as is utilized in fracturing operations which employ pressures up to 6,000 p.s.i., the liquid composition will have its melting point increased and the liquid will start to thicken or solidify. The obstructions created will divert the pressure vertically, causing fractures in the formation. As the fracture is made, the solid material will travel along the path of reduced pressure creating new obstructions and additional fractures which will ease the flow of oil in the formation to the bore hole.

In this process, the solidification of the liquid pumped under high pressure causes a temporary bridge which would divert the pressure and flow of the fluid in other directions, and as the pump pressure is increased additional breaks can be expected in a full 360° radius surrounding the bore hole area under treatment. After the passage of several hours, the naphthalene and dichlorobenzene will dissolve, due to its solvent action with the oil and the increased temperature in the bore hole area. This permits the seepage of oil through the area in which the process has been applied to the bore hole after the pressure has been reduced.

Where there are established fractures in the formation to be treated, an additional bridging agent could be used. This would temporarily seal off the farger fractures and divert the pressure in other areas to create new ones. Such an additional bridging agent may be Perlite which is an aluminum silicate. This can also function as a propping agent. Perlite is for the purpose of this invention relatively permeable and porous, and, since it is of only one-tenth to one-twelfth the weight of sand, it can be very easily pumped in fluid form with the organic composition and matter of this invention. Perlite is defined as a volcanic glass which, when heated or calcined, expands into the form of discrete globules of small particle size. In the process of this invention, it is desirable to use particle sizes of one-quarter inch on down, and which can be classified by size 40 down to size 10 screen. This material is chemically inert and holds up well under the high pressures of 6,000 p.s.i. contemplated in the fracturing and bridging operations.

Perlite is of distinct advantage in the process of this invention, since it is of small particle size and can be easily handled and pumped into the strata. Also, as a very noteworthy feature, it is relatively porous so that it can be filled with the organic composition of this matter in either solid or slurry form in the carrying out of the bridging operation. The organic composition, since it is oil soluble, will ultimately be dissolved out by the oil, and, as this material does not have particularly good structural strength or crystalline structure, its employment with Perlite is of great value. Ultimately, the organic composition will dissolve and permit the seepage of oil through the Perlite, which remains in the formation and functions as a propping agent. Since the range of melting points of the organic composition that is used to impregnate the Perlite is variable, a great adaptability in the process of this invention is made possible. This permits other uses of the process of this invention in many different types of strata at very different levels and differences in ambient temperature. Also, the rate of solubility can be varied, but in all circumstances the impregnating composition will ultimately be dissolved, allowing for free passage of liquid in a matter of five hours or less. However, the organic composition is not water soluble so it may be used to bridge or seal off water pockets and the like when desired. Due to the fluidity of the small particles of Perlite, some of it might be returned to the well hole, but it makes little difference whether it returns or stays in the formation because of the porosity, and as previously mentioned in fissured strata the Perlite will act as a propping agent with beneficial effects.

It is contemplated that the Perlite or any other porous mineral material can be used in combination with naphthalene, paradichlorobenzene, anthracene, thiacalinhydride, or any other oil soluble solid with satisfactory melting point and rate of solubility. Likewise, any combination of the above materials can be used to effect the desired melting point and solubility range. Also, orthodichlorobenzene can be employed with these materials if a slurry form is to be preferred.

In this invention, it has also been made possible to clean out scale from the formation surface and from within the oil well string to allow a better flow of oil. After a well has been producing, there is usually an accumulation of scale composed of high melting point solids, some of which are soluble in hydrocarbon solvents and some of which are soluble in water. For example, the scale could contain paraffin or asphalt along with salt. It is also known that insolubles can be trapped and set up in the scale with the other materials. In the cleaning process of this invention, a homogeneous mixture such as naphthalene and at least one of orthodichlorobenzene and paradichlorobenzene can be introduced in the form of slurry or solid that has a low melting point and excellent solvent properties for paraffin and asphalt, together with ground or flaked caustic soda.

This introduction of the organic composition and caustic can be made either simultaneously in the same mix as preferred, or there can be an introduction of these two components from separate sources into the same region. The physical form of the material can be in either dry form or in a slurry, where orthodichlorobenzene is utilized. The slurry has the advantage of flowing out through the tubing and catching onto the surface of the formation in a better fashion than the solid materials. This is also somewhat true in the fracturing and bridging operations previously described.

When sufficient material has been introduced to cover the surfaces of the deposited secretions, fresh water is introduced to the tubing. As a general rule of operation, each pound of caustic raises one pound of water to its boiling point, and therefore the temperature of the mass increases sharply, liquefying the organic solvents to attack paraffin and asphalt deposits. At the same time the caustic solution formed at the elevated temperature acts to dissolve any salt formation. Further, as the water is contacted with the caustic, there is considerable turbulence created which aids in attacking the accretions so that such deposits are removed through a joint solvent and agitating action. The insolubles in the scale have a tendency to leave the formation because the organic and inorganic binders holding them are removed, thus freeing the surface from these deposited accretions for better flow of oil.

If the organic composition utilized in the cleaning process is in solid form, it is desirable that the melting point be approximately the same as or less than that of the formation, so that there will be no danger of this material solidifying if the temperature created by the contact of the water with the caustic is dissipated. This makes for an easier removal of the dissolved scale which is brought to the surface through the bore hole. Should there be any solidifying of this composition, it will, however, eventually dissolve in the crude oil in the well.

The introduction of the material in the cleaning process can be introduced with the tubing still in place or with the tubing removed. There is an advantage in leaving the tubing in place in that the dissolved scale will be removed by pumping faster than if the tubing had to be replaced before pumping out. Further, of course, there is a substantial reduction in tie-up time, labor and expense involved where the tubing is allowed to remain in place. This cleaning process can also be utilized to remove solids in the tubing which reduce the size of the tubing and interfere with production of the well.

In oil fields of high paraffin or asphalt content, this problem is acute, and oftentimes the solids form right up to the pump rod, at which time the tubing has to be pulled and the material physically removed from the tubing. By filling the tubing either with the slurry or dry mix materials as mentioned above, action on the deposits in the tubing is similar to the action in cleaning the surfaces of the regions surrounding the bore hole when fresh water is introduced into the tubing.

It has been found in many cases that the blocking of the tubing is at the very top near the surface of the well. In these cases, the blocking may be quite severe at the top, due to the deposit of accretions, and may taper off in several hundred feet to where the tubing will be fairly clear. Rather than fill the entire tubing with solid or slurry material, the organic composition might be preheated at the surface with appropriate selection of melting point so that it solidifies at the top of the tubing. Thus, the melted material will begin to solidify when it is introduced into the top region of the tubing, and will form in solid form upon the deposited accretions. This represents a selection of the material which has a melting point above that of the portion of the tubing which is desired to be cleaned. This selection of the solid material can easily be determined by test or by reference to the melting point characteristics for naphthalene and paradichlorobenzene disclosed in my Patent No. 2,711,392. After the initially melted material has solidified, water will be introduced so that the scouring and solvent action can attack that particular section. By repeating this process, all of the deposits can eventually be removed. An outstanding advantage of this process is that the pump and rod can be left in the tubing, and as each stage is completed the well can be put on pump to clear out the desired solids.

The cleaning out of deposited accumulations of paraffin, asphalt and other petroleum residues in oil lines can further be effected by the use of a solid organic composition through a combination of attrition and solvent action. Naphthalene and dichlorobenzene may be made in the form of a solid material of burr-like form having sharp edges around its surface. This product may be made with varying melting points and solubility in a highly compressed shape to afford sharp edges for the cleaning of these oil lines. The compression utilized in forming such product should be high, and 40 tons of pressure per square inch have been successfully employed in making a burr of ½" diameter.

This product is generally indicated at 10 in Figures 1 to 4. As shown in Figures 1, 3 and 4, it has a rounded bottom 11, with vertical sides 12. The top 13 is rounded and has four radially extending ridges 14, 15, 16 and 17 protruding thereabove.

By means of this construction, the product is somewhat unbalanced as it is unsymmetrical. Therefore, when it is placed in a moving fluid stream, it will tumble and move about so that the ridges 14, 15, 16 and 17 hit against the sides of a pipe line with some force.

The naphthalene and paradichlorobenzene are completely soluble in crude oil and can be safely used in any oil line or field tanks, and have beneficial effects in preventing paraffin accumulation in the tanks themselves. The cleaning action would be by both abrasion and solvency, as this above mentioned composition has a very definite solvent property when contacted with paraffin and is quite effective.

The burr-like article 10 can be introduced to the line through a valve at the well head very easily and in an expeditious manner. When the valve is closed, the pressure in the line forces the burrs along, giving the necessary cleaning action on the inside of the line through attrition to remove asphalt, paraffin and other petroleum residues. Also, due to this attrition action, deposited accretions other than organic can be removed. There is no danger of stopping the line because the product is completely soluble in crude oil within a period of five hours or less. It thus has the advantage of never fouling the line and because of its ability to be made in burr-like form, which will permit an easy fitting in the oil line, it can pass joints or angles without clogging.

Initial tests have shown that a package of a hundred burrs will clean a 3-inch line up to 3,000 feet in length. The burr-like material is volatile and is packed in double-walled cellophane packages which maintain the sharp edges by protecting from volatization and also afford a measured dosage. For preventive maintenance, it is recommended that one package per week be used for approximately each 1,000 feet of 3-inch line. This particular process has distinct advantages over solvent cleaning, steam cleaning, or mechanical ferrets, since tie-up of the line and its removal from production are not required. It can be used as a preventive, as mentioned above, once a week at low cost with practically no expenditure of labor or time involved in the treatment. The treatment also can be easily carried out by a field pumper in a few minutes' time, and this employment by unskilled workmen is a very noteworthy feature.

Various changes and modifications may be made in the practice of this invention, as will be apparent to those skilled in the art. Such changes and modifications are within the scope of this invention and come under the teaching thereof.

What is claimed is:

1. A process for performing at least one of the operations of fracturing and bridging an oil bearing formation surrounding a bore hole section which comprises introducing a viscous fluid composition to said formation beneath the ground level under an elevated oil bearing formation fracturing pressure in which said fluid composition includes a porous inorganic insoluble discrete material having incorporated in its interstices an organic composition consisting essentially of at least one member of the group consisting of naphthalene, paradichlorobenzene, anthracene and thiacalinhydride which when introduced to said formation under said elevated fracturing pressure is in itself viscous and has the capacity at elevated pressure to block the flow of oil and water and is further characterized by its reduced viscosity solubility in oil when said pressure is reduced and insolubility in water.

2. A process for performing at least one of the operations of fracturing and bridging an oil bearing formation surrounding a bore hole section which comprises introducing a viscous fluid composition to said formation beneath the ground level under an elevated oil bearing formation fracturing pressure in which said fluid composition includes a porous inorganic insoluble discrete material having incorporated in its interstices an organic composition which when introduced to said formation under said elevated fracturing pressure is in itself viscous and is further characterized by its solubility in oil and insolubility in water, said organic composition having a reduced viscosity when the pressure is reduced and said organic composition comprising naphthalene and at least one member of the group consisting of orthodichlorobenzene and paradichlorobenzene.

3. A process for performing at least one of the operations of fracturing and bridging an oil bearing formation surrounding a bore hole section which comprises introducing a viscous fluid composition to said formation beneath the ground level under an elevated oil bearing formation fracturing pressure in which said fluid composition includes a porous inorganic insoluble discrete material having incorporated in its interstices an organic composition consisting essentially of at least one member of the group consisting of naphthalene, paradichlorobenzene, anthracene and thiacalinhydride which when introduced to said formation under said elevated fracturing pressure is in itself viscous and is further characterized by its solubility in oil and insolubility in water, and reducing said pressure, said fluid composition being further characterized by the ability of said organic composition to have its viscosity reduced by a reduction in pressure, to be dissolved by crude oil in said formation after a period of time and by the ability of said porous discrete material to prop fissures formed in said pressuring operation and to pass crude oil through its pores.

4. A process for performing at least one of the operations of fracturing and bridging an oil bearing formation surrounding a bore hole section which comprises introducing a viscous fluid composition to said formation beneath the ground level under an elevated oil bearing formation fracturing pressure in which said fluid composition includes a porous inorganic insoluble discrete material having incorporated in its interstices an organic composition which when introduced to said formation under said elevated fracturing pressure is in itself viscous and is further characterized by its solubility in oil and insolubility in water, and reducing said pressure, said fluid composition being further characterized by the ability of said organic composition to have its viscosity reduced by a reduction in pressure, to be dissolved by crude oil in said formation after a period of time and by the ability of said porous discrete material to prop fissures formed in said pressuring operation and to pass crude oil through its pores, said organic composition comprising naphthalene and at least one member of the group consisting of orthodichlorobenzene and paradichlorobenzene.

References Cited in the file of this patent

UNITED STATES PATENTS

| Number | Name | Date |
|---|---|---|
| 1,097,406 | Erlenbach | May 19, 1914 |
| 1,754,296 | Ackerman | Apr. 15, 1930 |
| 1,861,177 | De Groote | May 31, 1932 |
| 1,870,320 | Adams et al. | Aug. 9, 1932 |
| 1,886,008 | Gorman | Nov. 1, 1932 |
| 1,928,226 | Ladd | Sept. 26, 1933 |
| 2,139,595 | Terch | Dec. 6, 1938 |
| 2,204,224 | Limerick et al. | June 11, 1940 |
| 2,206,677 | Shepler | July 2, 1940 |
| 2,352,805 | Scheuermann | July 4, 1944 |
| 2,361,558 | Mason | Oct. 31, 1944 |
| 2,411,044 | Landrum et al. | Nov. 12, 1946 |
| 2,437,456 | Bodine | Mar. 9, 1948 |
| 2,596,845 | Clark | May 13, 1952 |
| 2,645,291 | Voorhees | July 14, 1953 |
| 2,661,066 | Bond | Dec. 1, 1953 |
| 2,674,756 | Bilhartz et al. | Apr. 13, 1954 |
| 2,681,704 | Menaul | June 22, 1954 |
| 2,695,669 | Sidwell | Nov. 30, 1954 |
| 2,711,392 | Irwin | June 21, 1955 |
| 2,724,439 | Brainerd | Nov. 22, 1955 |
| 2,731,404 | Binder et al. | Jan. 17, 1956 |
| 2,734,861 | Scott | Feb. 14, 1956 |

FOREIGN PATENTS

| 143,656 | Switzerland | Feb. 2, 1943 |